United States Patent
Pan et al.

(10) Patent No.: US 8,537,494 B1
(45) Date of Patent: Sep. 17, 2013

(54) PMR HEAD WITH AN ANGLED STITCH LAYER

(75) Inventors: Tao Pan, San Jose, CA (US); Yugang Wang, Milpitas, CA (US); Kroum S. Stoev, Pleasanton, CA (US)

(73) Assignee: Western Digital (Fremont), LLC, Fremont, CA (US)

(*) Notice: Subject to any disclaimer, the term of this patent is extended or adjusted under 35 U.S.C. 154(b) by 1169 days.

(21) Appl. No.: 11/935,508

(22) Filed: Nov. 6, 2007

(51) Int. Cl.
*G11B 5/127* (2006.01)

(52) U.S. Cl.
USPC ............................................. 360/125.04

(58) Field of Classification Search
USPC ............. 360/125.03, 125.04, 125.06, 125.07, 360/125.08, 125.11, 125.12, 125.15, 119.02, 360/119.03, 119.04
See application file for complete search history.

(56) References Cited

U.S. PATENT DOCUMENTS

| | | | |
|---|---|---|---|
| 5,805,391 A | 9/1998 | Chang et al. | |
| 6,282,056 B1 | 8/2001 | Feng et al. | |
| 6,306,311 B1 | 10/2001 | Han et al. | |
| 6,337,783 B1 | 1/2002 | Santini | |
| 6,469,874 B1 | 10/2002 | Han et al. | |
| 6,490,125 B1 | 12/2002 | Barr | |
| 6,490,127 B1 * | 12/2002 | Sasaki | 360/125.57 |
| 6,504,677 B1 | 1/2003 | Han et al. | |
| 6,583,966 B2 | 6/2003 | Han et al. | |
| 6,608,737 B2 | 8/2003 | Han et al. | |
| 6,612,017 B2 | 9/2003 | Santini | |
| 6,657,816 B1 | 12/2003 | Barr et al. | |
| 6,826,015 B2 | 11/2004 | Chen et al. | |
| 7,113,366 B1 | 9/2006 | Wang et al. | |
| 7,130,153 B2 | 10/2006 | Shen et al. | |
| 7,889,456 B2 | 2/2011 | Jiang et al. | |
| 8,238,056 B2 * | 8/2012 | Guan et al. | 360/119.02 |
| 2002/0030929 A1 | 3/2002 | Sasaki | |
| 2005/0047011 A1 | 3/2005 | Han et al. | |
| 2005/0219747 A1 * | 10/2005 | Hsu et al. | 360/126 |
| 2005/0259357 A1 * | 11/2005 | Kameda | 360/126 |

* cited by examiner

*Primary Examiner* — Joseph Feild
*Assistant Examiner* — Gustavo Polo (57) ABSTRACT

A method and system for providing a magnetic transducer having an air-bearing surface (ABS) are described. The magnetic transducer includes a perpendicular magnetic recording (PMR) pole, an additional pole, a stitch, a shield, a write gap between the PMR pole and a portion of the shield, and at least one coil that energizes at least the additional pole. The PMR pole has a first front portion proximate to the ABS, while the additional pole is recessed from the ABS. The stitch resides between the PMR pole and the additional pole and has a stitch front portion between the front portion of the PMR pole and the additional pole. At least a portion of the write gap resides on the front portion of the PMR pole. At least a portion of the additional pole resides between the PMR pole and the shield.

27 Claims, 6 Drawing Sheets

PMR HEAD WITH AN ANGLED STITCH LAYER

BACKGROUND

Figure 1:
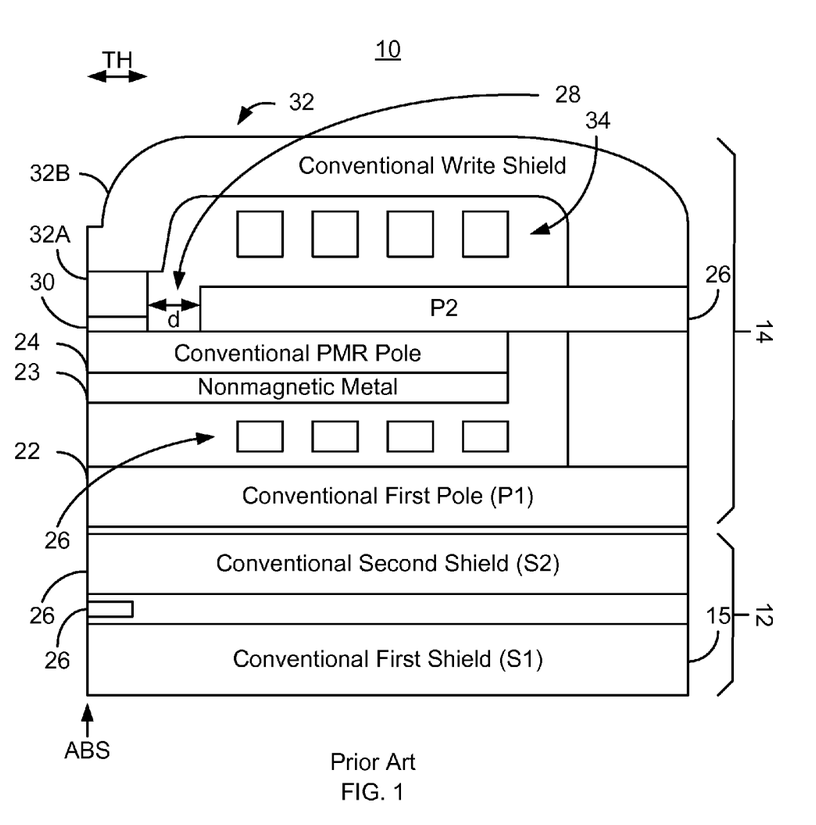
FIG. 1 depicts a conventional PMR write head.

In order to write data to and read data from a media, a recording head is typically used. FIG. 1 depicts a conventional perpendicular magnetic recording (PMR) head 10 that includes a read transducer 12 and a conventional write transducer 14. For clarity, FIG. 1 is not drawn to scale. Although both the conventional read transducer 12 and the conventional write transducer 14 are shown, the conventional write transducer 14 may be part of a head that only performs writing. In addition, the conventional PMR head 10 may also include a slider (not shown).

The read transducer 12 includes a first shield (S1) 15, a read sensor 16, and a second shield (S2) 18. The conventional PMR write transducer 14 includes a first pole 20 that may be separate from the S2 18, a first coil 22, a metal underlayer 23, a conventional PMR pole 24, a second pole (P2) 26, an insulating space 28, a write gap 30, a conventional shield 32 that may include portions 32A and 32B, and a second coil 34. The conventional shield 32 perpendicular to the ABS that is on the order of thirteen to sixteen micrometers. The nonmagnetic metal underlayer 23 may be used under the conventional PMR pole 24 to improve manufacturability of the conventional PMR pole 24. As a result, the conventional P2 26 resides on top of the conventional PMR pole 24. Although not explicitly shown, seed layer(s) may be used in providing the conventional poles 22, 24, and 26. The conventional PMR write transducer 14 is also depicted with two coils 26 and 34. However, PMR heads having a single coil are also typically used. In addition, the throat height (TH) and shield height (SH) are also shown.

In order to write data to a PMR media, the coils 26 and 34 are energized. Consequently, the conventional P2 26 and conventional PMR pole 24 are magnetized and the media written by flux from the pole tip of the conventional PMR pole 24. Based on the direction of current through the coils 26 and 34, the direction of magnetic flux through the conventional PMR pole 24 changes. Thus, bits having opposing magnetization can be written and the desired data stored on the PMR media.

Although the conventional PMR head 10 functions, there may be drawbacks, particularly in adapting the conventional PMR head 10 to higher densities. In particular, the conventional PMR head 10 may have poor write efficiency at hither densities. In the conventional PMR head 10, the P2 26, or yoke, is at the top of the conventional PMR pole 24. The insulating spacing 28 that separates P2 26 from the shield portion 32A typically has a depth, d, of at least one micron. This depth is sufficient to ensure that the fabrication of the conventional PMR head 10 may be performed with sufficient process margins. For example, the P2 26 and shield portion 32A may be formed from the same material and at the same time. The insulator 28 might be formed by removing a portion of this material, refilling using an insulator, and performing a planarization. In order to ensure that this can be accomplished with sufficient yield, the P2 26 is placed at least one micron from the back of the shield portion 32A. Stated differently, the depth, d, is at least one micron. When the conventional PMR head 10 is scaled to higher densities, the thickness of the poles 24 and 26 may be reduced. Despite its reduced thickness, the P2 26 is still spaced from the back of the shield portion 32A by at least one micron. As a result, the write efficiency of the conventional PMR head 10 may be reduced.

Accordingly, what is needed is a system and method for improving the write efficiency of a PMR head, particularly at higher densities.

BRIEF SUMMARY OF THE INVENTION

A method and system for providing a magnetic transducer having an air-bearing surface (ABS) are described. The magnetic transducer includes a perpendicular magnetic recording (PMR) pole, an additional pole, a stitch, a shield, a write gap between the PMR pole and a portion of the shield, and at least one coil that energizes at least the additional pole. The PMR pole has a first front portion proximate to the ABS, while the additional pole is recessed from the ABS. The stitch resides between the PMR pole and the additional pole and has a stitch front portion between the front portion of the PMR pole and the additional pole. At least a portion of the write gap resides on the front portion of the PMR pole. At least a portion of the additional pole resides between the PMR pole and the shield.

DETAILED DESCRIPTION OF THE PREFERRED EMBODIMENTS

Figure 2:
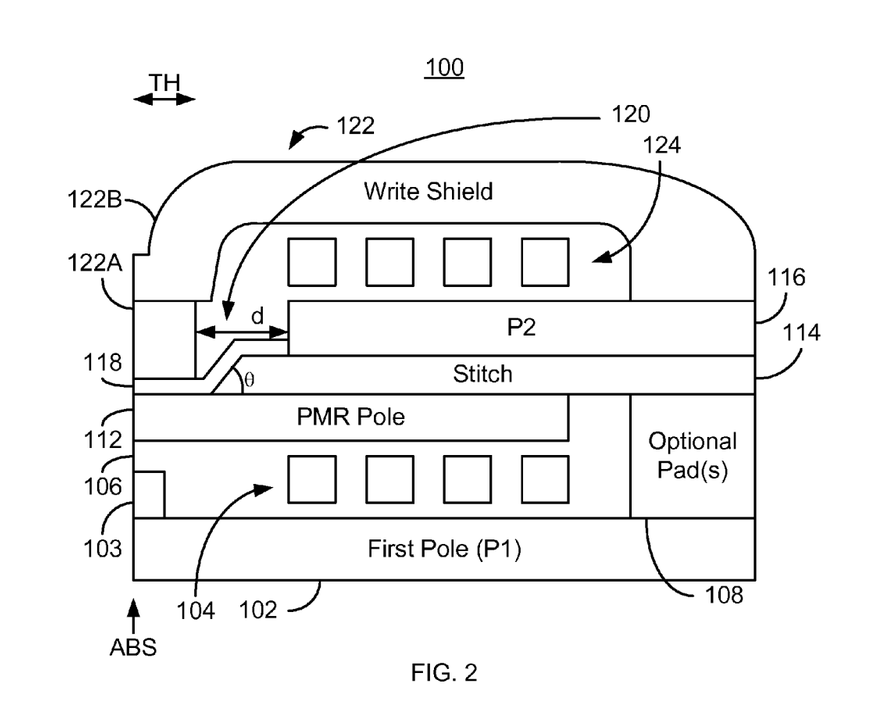
FIG. 2 is a diagram depicting an exemplary embodiment of a PMR transducer.

FIG. 2 is a diagram depicting an exemplary embodiment of a PMR transducer 100. The PMR transducer 100 includes at least a first pole (P1) 102, optional P1 pedestal 103, a first coil 104, an insulator 106, optional pad 108, a PMR pole 112, a stitch 114, a second pole (P2) 116, a write gap 118, an insulator 120, a shield 122, and a second coil 124. For clarity, the PMR transducer 100 is not drawn to scale. Although shown alone, the PMR transducer 100 may be part of a head that includes a slider and may also include a read transducer (not shown).

The P1 102 and PMR pole 116 are ferromagnetic and, therefore, may include materials such as Fe, Ni, and Co. In one embodiment, the P1 102, PMR pole 112, and P2 116 may have a high saturation magnetization, for example at least approximately two Tesla. The PMR pole 116 extends from the ABS, past the front of the P2 116. Thus, the P2 116 and the PMR pole 112 overlap. The PMR pole 112 may reside on the insulator 106. In an alternate embodiment, the PMR pole 112 may reside on an underlayer layer (not shown), such as a nonmagnetic metal layer. The optional pad 108 may include one or more structures formed at different times. The P2 116 is recessed from the ABS, magnetic, and may have a high saturation magnetization. The P2 116 may thus include materials such as Fe, Ni, and Co. The shield 122 may also be magnetic and may have a high saturation magnetization. In addition, the shield 122 may be viewed as having two portions 122A and 122B that may be formed separately. The P2 116 is separated from a back of the portion 122A of the shield 122 by a distance, d. In one embodiment, the distance d is at least one micron. In another embodiment, the distance d may be greater, including 1.5 micrometer or more.

The PMR transducer 100 also includes a stitch 114 between the P2 116 and the PMR pole 112. In one embodiment, the stitch is not more than 0.5 micrometers from the back of the portion 122A of the shield 122. The stitch 114 may also be thin. In one embodiment, the stitch 114 is the stitch 114 may be 0.15 micrometers or less. In another embodiment, the stitch 114 may be thicker, for example 0.2-0.3 microns. The stitch 114 is magnetic and, therefore, may include materials such as Fe, Ni, and Co. For example, the stitch 114 may include $Ni_{45}Fe_{55}$ and/or CoFe. In one embodiment, the stitch 114 has a high saturation moment of at least approximately 1.6 Tesla. The stitch 114 may also be soft, for example having a coercivity of less than two hundred Oe. In addition, the stitch has a front angle, $\theta$, that is less than ninety degrees. In one embodiment, the angle $\theta$, is at least thirty degrees and not more than sixty-five degrees. Moreover, the front of the stitch 114 is between the ABS and the front of P2 116. In one embodiment, the front of the stitch 114 is not more than one micron from the ABS. In another embodiment, the front of the stitch 114 is between fifty nanometers and one micron from the ABS. In another embodiment, the stitch 114 is not more than ten nanometers from the ABS.

In the embodiment shown, the write gap 118 extends from the ABS to the P2 116. In another embodiment, the write gap 118 may not extend to the P2 116. In addition, the write gap 118 has an angled portion which follows the front edge of the stitch 114. Stated differently, a portion of the write gap 118 has a component that is not in the plane of the remaining layers. However, near the ABS, the write gap 118 is in the plane of the layers.

The PMR transducer 100 is also shown as including coils 104 and 124. The coils 104 and 124 may be used to energize the PMR pole 112 and P2 116. Although two coils 104 and 124 are shown, the PMR transducer 100 may include another number of coils. In addition, the configuration of the coils 104 and 124 may vary. For example, the coils 104 and/or 124 may be helical or pancake.

In operation, the coils 104 and 124 are energized. Consequently, the PMR pole 112, P2 116, and stitch 114 are magnetized. The media (not shown), may then be written by flux from the pole tip of the PMR pole 112. Based on the direction of current through the coils 104 and 124, the direction of magnetic flux through the PMR pole 112 changes. Thus, bits having opposing magnetization can be written and the desired data stored on the PMR media.

As discussed above, the stitch 114 may be magnetized during writing using the PMR transducer 100. In addition, the front of the stitch 114 may be significantly less than one micron from the ABS. In one embodiment, therefore, the stitch 112 may be closer to the ABS than the P2 116. As a result, the stitch 114 may significantly aid in transferring flux to the PMR pole 112, particularly the tip of the PMR pole 112. Because the efficiency of flux transfer to the PMR pole 112 may be improved, writeability of the PMR transducer 100 may be improved. In particular, the PMR transducer 100 may have sufficient writeability even at higher densities at which thicknesses of the poles 102, 112, and/or 116 are reduced. Consequently, performance of the PMR transducer 100 may be improved. This improvement may be achieved without sacrificing manufacturability because issues relating to removal of a middle portion of a layer and refilling may be avoided for the stitch 114.

Figure 3:
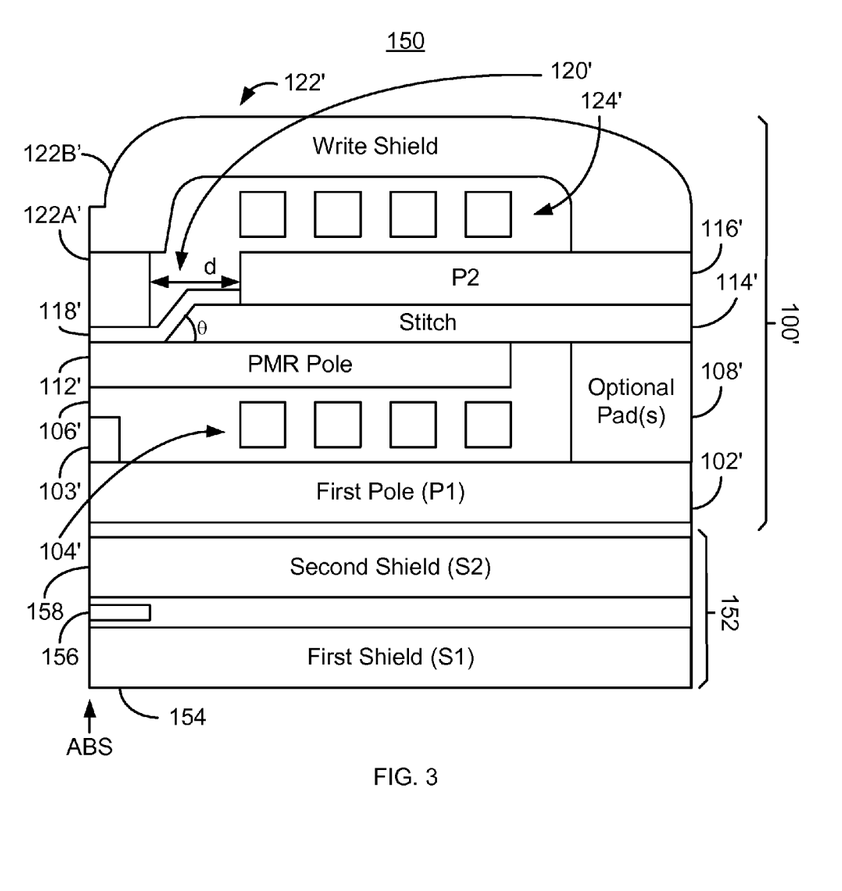
FIG. 3 is a diagram depicting an exemplary embodiment of a PMR head.

FIG. 3 is a diagram depicting an exemplary embodiment of a PMR head 150. For clarity, the PMR head 150 is not drawn to scale. The PMR head 150 is a merged head including a read transducer 152, a PMR write transducer 100', and a slider (not shown). The read transducer 152 includes a first shield 154, a read sensor 156, and a second shield 158. In one embodiment, the read sensor is a magnetoresistive sensor, such as a spin valve or magnetic tunneling junction. However, in another embodiment, the read sensor could be another structure.

The PMR transducer 100' is analogous to the PMR transducer 100. Consequently, portions of the PMR transducer 100' are labeled similarly to the PMR transducer 100 depicted in FIG. 2. Referring back to FIG. 3, the PMR transducer 100' thus includes at least a P1 102', optional P1 pedestal 103', a coil 104', an insulator 106', optional pad 108', a PMR pole 112', a stitch 114', a P2 116', a write gap 118', an insulator 120', a shield 122', and a second coil 124'. Although the P1 102' and second shield 158 are shown as separate structure, in one embodiment, they may be combined. The P1 102', first coil 104', insulator 106', optional pads 108', PMR pole 112', stitch 114', P2 116', write gap 118', insulator 120', shield 122', and the second coil 124' may have an analogous structure and function to that discussed previously.

The stitch 114' is configured in a similar manner to the stitch 114. Thus, in one embodiment, the stitch 114' is between the ABS and the front of P2 116'. In one embodiment, the front of the stitch 114' is not more than one micron from the ABS. In another embodiment, the front of the stitch 114' is between fifty nanometers and one micron from the ABS. In another embodiment, the front of the stitch 114' is not more than ten nanometers from the ABS. In one embodiment, the stitch 114' may be 0.15 micrometers or less thick. In another embodiment, the stitch 114' may be thicker, for example 0.2-0.3 microns. The stitch 114' is magnetic and, therefore, may include materials such as Fe, Ni, and Co. In one embodiment, the stitch 114 has a high saturation magnetization of at least approximately two Tesla. In addition, the stitch has a front angle, $\theta'$, that is less than ninety degrees. In one embodiment, the angle $\theta'$, is at least thirty degrees and not more than sixty-five degrees.

In the embodiment shown, the write gap 118' has an angled portion which follows the front edge of the stitch 114'. Stated differently, a portion of the write gap 118' has a component that is not in the plane of the remaining layers. However, near the ABS, the write gap 118' is in the plane of the layers.

In operation, the coil(s) 104' and 124' are energized. Consequently, the PMR pole 112', P2 116', and stitch 114' are magnetized. The media (not shown), may then be written by flux from the pole tip of the PMR pole 112'. Based on the direction of current through the coils 104' and 124' the direction of magnetic flux through the PMR pole 112' changes.

As discussed above, stitch 114' is magnetic and may be significantly less than one micron from the ABS. The stitch 114' may thus be closer to the ABS than the P2 116'. The stitch 114' may also aid in transferring flux to the tip of the PMR pole 112'. Thus, writeability of the PMR head 150 may be improved. In particular, the PMR head 150 may be used even at higher densities having reduced thicknesses of the poles 102, 114, and/or 116. Consequently, performance of the PMR transducer 100 may be improved. This improvement may be achieved without sacrificing manufacturability because issues relating to removal of a middle portion of a layer and refilling may be reduced or avoided for the shield portion 122A and P2 116.

Figure 4:
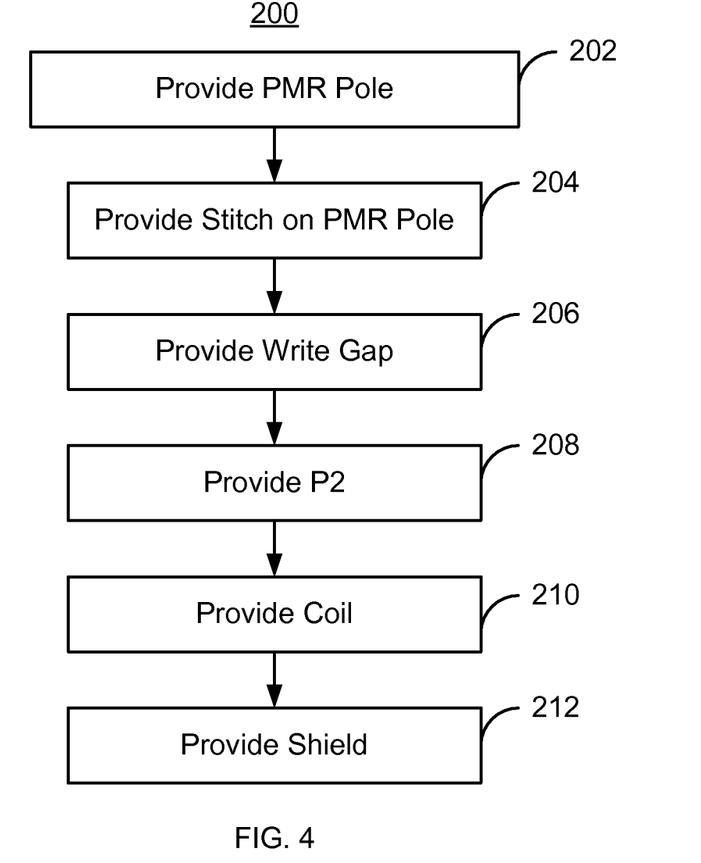
FIG. 4 is a flow-chart depicting an exemplary embodiment of a method for providing a PMR transducer.

FIG. 4 is a flow-chart depicting an exemplary embodiment of a method 200 for providing a PMR transducer. For clarity, the method 200 is described in the context of the PMR transducer 100. For simplicity, some steps of the method 200 may be omitted or combined. Referring to FIGS. 2 and 4, the method 200 commences after formation of the P1 102, coil 104, and insulator 106.

The PMR pole 112 is provided, via step 202. The stitch 114 is provided on the PMR pole 112, via step 204. In one embodiment, step 204 includes blanket depositing the material(s) stitch 114, then removing a portion of the material(s) near the ABS. In addition, step 204 may include shaping the stitch 114 to form the angle, θ. The write gap 118 is provided near the ABS surface, or pole tip, of the PMR pole 112, via step 206. A portion of the write gap 120 thus resides on the stitch 114. The P2 116 is provided, via step 208. Step 208 includes providing the P2 116 recessed from the ABS and such that at least a portion of the P2 118 resides on the PMR pole 116. In one embodiment, step 208 also includes providing the portion 122A of the shield 122. In one embodiment, step 208 includes providing a mask on the PMR transducer 100 after formation of the PMR pole 116. A portion of the mask covers a portion of the magnetic transducer 100 between the ABS and the desired location of the P2 116. In such an embodiment, step 208 includes depositing material (s) for the P2 116 from at least the ABS to at least a desired location of the back of the additional pole. Step 208 would also include lifting off the mask. Consequently, a first remaining portion of the material(s) proximate to the ABS would the portion 122A of the shield 122, while a second remaining portion of the material would form the P2 116.

The coil 124 is provided, via step 210. In one embodiment, step 210 also includes insulating the coil 124 such that electrical contact is not made between the P2 116 and the coil 124 and between the shield 122 and the coil 124. The shield 122 is provided, via step 212. In one embodiment, step 212 includes providing the portion 122B of the shield 122.

Thus, using the method 200, a write transducer, such as the write transducer 100 may be provided. Consequently, the method 200 may be used to fabricate a write transducer having improved write efficiency and that is better able to be used at higher densities.

Figure 5:
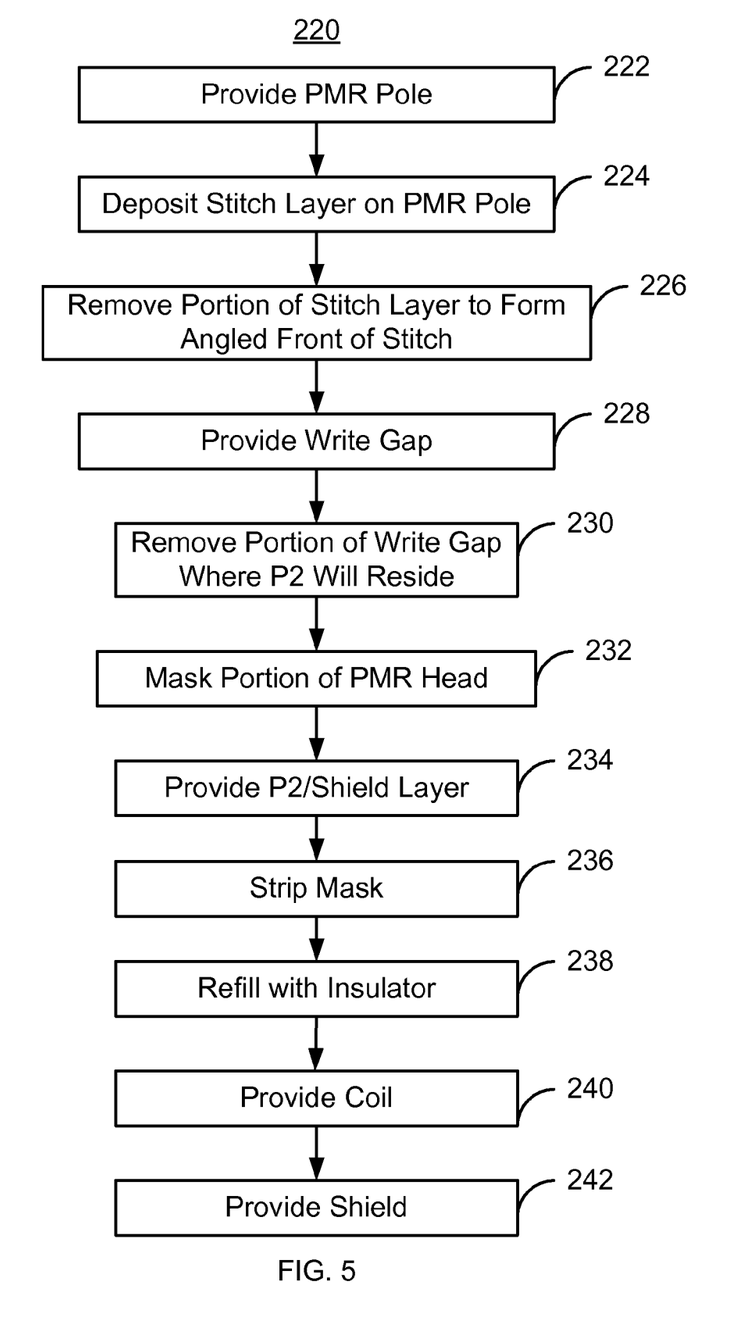
FIG. 5 is a flow-chart depicting another exemplary embodiment of a method for providing a PMR head.

FIG. 5 is a flow-chart depicting another exemplary embodiment of a method 220 for providing a PMR head. For clarity, the method 220 is described in the context of the PMR head 150. For simplicity, some steps of the method 220 may be omitted or combined. Referring to FIGS. 3 and 5, the method 220 commences after formation of the P1 102', coil 104', and insulator 106'.

The PMR pole 112' is provided, via step 222. A stitch layer is deposited on the PMR pole 112', via step 224. The stitch layer includes materials used in the stitch. A portion of the stitch layer adjacent to the ABS is removed, via step 226. Thus, the front of the stitch 114' having the angle, θ, may be formed in steps 222.

The write gap 118' is provided, via step 228. In one embodiment, a portion of the write gap 118' provided in step 228 resides on the PMR pole 112' near the ABS, while another portion resides on a portion of the stitch 114'. In one embodiment, step 228 includes blanket depositing the write gap material. Consequently, a portion of the write gap material that is located where P2 116' is optionally removed in step 230. A portion of the PMR head 150 is masked, via step 232. In one embodiment, the region 120' is covered by the mask formed in step 232. Material(s) for the P2 116' are provided, via step 234. In one embodiment, the material(s) are deposited from the ABS to at least the back of the P2 116'. The mask is lifted off, which also removes a portion of the P2 116' material(s) deposited on the mask, via step 236. The portion removed corresponds to the region 120' between the shield portion 122A' and the P2 116'. Thus, a recess is formed in the PMR head 150.

The recess is refilled using an insulator, via step 238. Thus, the region 120' is formed. In addition, the shield portion 122A' and P2 116' are formed. The coil 124' is provided, via step 240. The coil 124' is also insulated in step 240. Thus, the coil 124' is insulated such that electrical contact is made not between the P2 116' and the coil 124' nor between the shield 122' and the coil 124'. The shield 122' is provided, via step 242. In one embodiment, step 238 includes providing the portion 122B of the shield to complete shielding of the PMR head 150.

Thus, using the method 220, a write head, such as the write head 150 including the write transducer 100' may be provided. Consequently, the method 220 may be used to fabricate a write transducer having improved write efficiency and that is better able to be used at higher densities.

Figure 6:
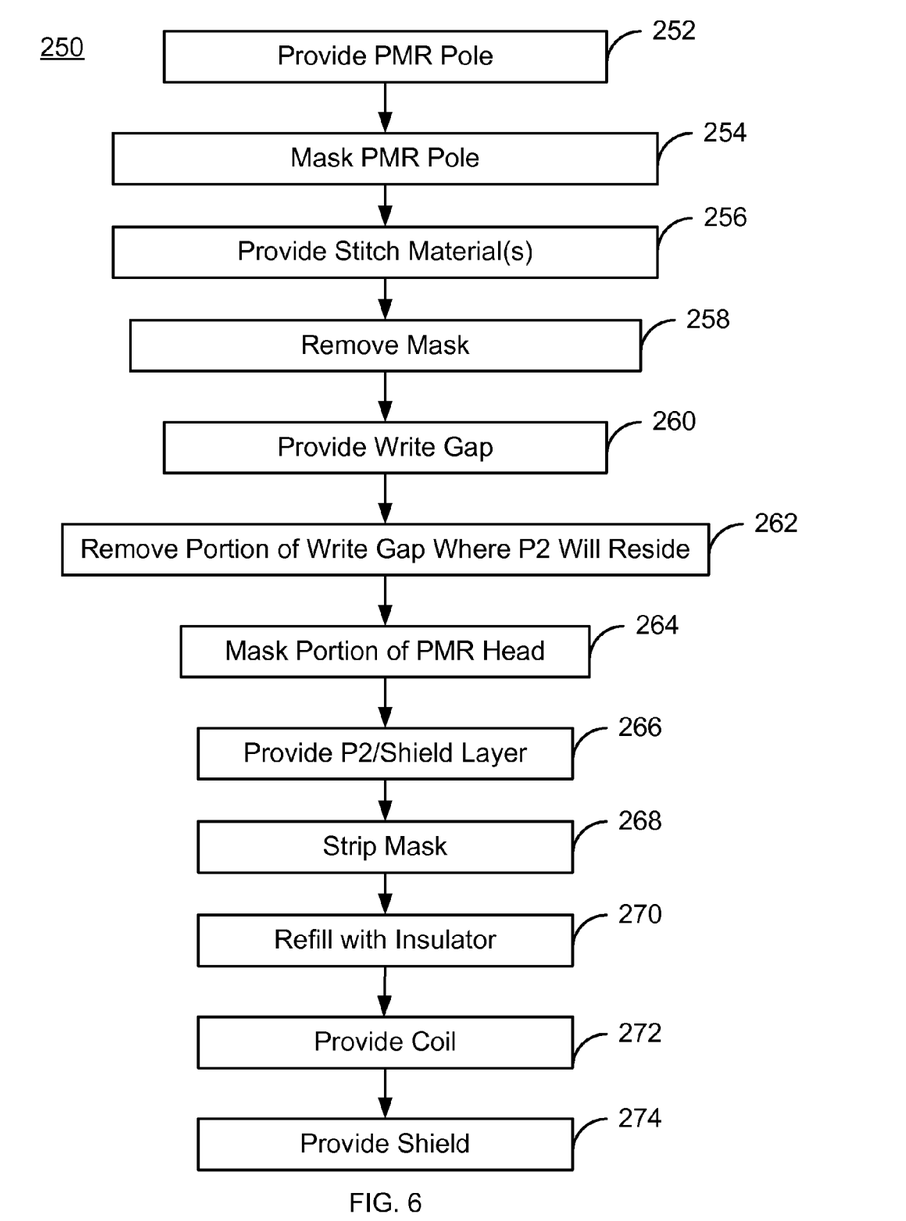
FIG. 6 is a flow-chart depicting another exemplary embodiment of a method for providing a PMR head.

FIG. 6 is a flow-chart depicting another exemplary embodiment of a method 250 for providing a PMR head. For clarity, the method 250 is described in the context of the PMR head 150. For simplicity, some steps of the method 250 may be omitted or combined. Referring to FIGS. 3 and 6, the method 250 commences after formation of the P1 102', coil 104', and insulator 106'.

The PMR pole 112' is provided, via step 252. A portion of the PMR pole in proximity to the ABS is covered with a mask, via step 254. The mask may extend from the ABS to a desired location for the front of the stitch 114'. A stitch layer is deposited on the PMR pole 112', via step 256. The stitch layer includes materials used in the stitch. A portion of the stitch layer resides on the PMR pole 112', while another portion resides on the mask. The mask is removed, via step 258. Consequently, a portion of the stitch layer on the mask is also removed in step 258. Thus, the stitch 114' having the angle, θ, may be formed in steps 254-258.

The write gap 118' is provided, via step 260. In one embodiment, a portion of the write gap 118' provided in step 260 resides on the PMR pole 112' near the ABS, while another portion of the write gap 118' resides on a portion of the stitch 114'. In one embodiment, step 260 includes blanket depositing the write gap material. Consequently, a portion of the write gap material that is located where P2 116' is optionally removed in step 262. A portion of the PMR head 150 is masked, via step 264. In one embodiment, the region 120' is covered by the mask formed in step 264. Material(s) for the P2 116' are provided, via step 266. In one embodiment, the material(s) are deposited from the ABS to at least the back of the P2 116'. The mask is lifted off, which also removes a portion of the P2 116' material(s) deposited on the mask, via step 268. The portion removed corresponds to the region 120' between the shield portion 122A' and the P2 116'. Thus, a recess is formed in the PMR head 150.

The recess is refilled using an insulator, via step 270. Thus, the region 120' is formed. In addition, the shield portion 122A' and P2 116' have been re formed. The coil 124' is provided, via step 272. The coil 124' is also insulated in step 240. Thus, the coil 124' is insulated such that electrical contact is made not between the P2 116' and the coil 124' nor between the shield 122' and the coil 124'. The shield 122' is provided, via step 274. In one embodiment, step 238 includes providing the portion 122B of the shield to complete shielding of the PMR head 150.

Thus, using the method 250, a write head, such as the write head 150 including the write transducer 100' may be provided. Consequently, the method 250 may be used to fabricate a write transducer having improved write efficiency and that is better able to be used at higher densities.

We claim:

1. A magnetic transducer having an air-bearing surface (ABS), the magnetic transducer comprising:
   a perpendicular magnetic recording (PMR) pole having a front portion proximate to the ABS;
   an additional pole recessed from the ABS and having a pole front surface substantially parallel to the ABS;
   a stitch between the PMR pole and the additional pole, the stitch having a stitch front portion between the ABS and the additional pole and a bottom, the stitch front portion having a front surface at an angle with respect to the bottom of the stitch, the angle being less than ninety degrees and greater than zero degrees;
   a write gap, at least a portion of the write gap residing on the front portion of the PMR pole;
   a shield, the write gap residing between the PMR pole and a portion of the shield, at least a portion of the additional pole residing between the PMR pole and the shield, a first portion of the additional pole adjoining the shield, the pole front surface of the additional pole being separated from the shield, the pole front surface of the additional pole being a first distance from the ABS, the front surface of the stitch terminating a second distance from the ABS, the first portion of the additional pole commencing a third distance from the ABS, the first distance being greater than the second distance and less than the third distance, at least a second portion of the additional pole adjoining the stitch; and
   at least one coil for energizing at least the additional pole.

2. The magnetic recording transducer of claim 1 wherein the stitch front is not more than one micron from the ABS.

3. The magnetic recording transducer of claim 2 wherein the stitch front is between fifty nanometers and one micron from the ABS.

4. The magnetic recording transducer of claim 2 wherein the stitch front is not more than ten nanometers from the ABS.

5. The magnetic recording transducer of claim 1 wherein the angle is at least thirty degrees and not more than sixty-five degrees.

6. The magnetic recording transducer of claim 1 wherein the portion of the shield and the additional pole share a composition.

7. The magnetic transducer of claim 1 wherein the additional pole is recessed from the portion of the shield by at least one micrometers.

8. The magnetic transducer of claim 1 wherein the PMR pole has a top surface and the write gap includes an angled portion, the angled portion being non-coplanar with the top surface of the PMR pole.

9. A magnetic transducer having an air-bearing surface (ABS), the magnetic transducer comprising:
   a perpendicular magnetic recording (PMR) pole having a front portion proximate to the ABS;
   an additional pole recessed from the ABS and having a pole front surface substantially parallel to the ABS;
   a stitch between the PMR pole and the additional pole, the stitch having a stitch front portion and a bottom, the stitch front portion residing between the front portion and the additional pole, the stitch front portion having a front surface at an angle with respect to a bottom of the stitch, the angle being at least thirty degrees and not more than sixty-five degrees;
   a write gap, a first portion of the write gap residing on the front portion, a second portion of the write gap residing on stitch front portion;
   a shield, the write gap residing between the PMR pole and a portion of the shield, at least a portion of the additional pole residing between the PMR pole and the shield, the pole front surface of the additional pole being at least one micrometer from the portion of the shield, a first portion of the additional pole adjoining the shield, at least a second portion of the additional pole adjoining the stitch, the front surface of the additional pole being separated from the shield, the pole front surface of the additional pole being a first distance from the ABS, the front surface of the stitch terminating a second distance from the ABS, the first portion of the additional pole commencing a third distance from the ABS, the first distance being greater than the second distance and less than the third distance; and
   at least one coil for energizing at least the additional pole.

10. A head comprising:
    a read transducer; and
    a magnetic write transducer having an air-bearing surface (ABS), the magnetic transducer further including a perpendicular magnetic recording (PMR) pole, an additional pole, a stitch, a write gap, a shield, and a coil, the PMR pole having a front portion proximate to the ABS, the additional pole being recessed from the ABS and having a pole front surface substantially parallel to the ABS, the stitch residing between the PMR pole and the additional pole, the stitch having a stitch front portion between the front portion and the additional pole and a bottom, the stitch front portion having a front surface at an angle with respect to the bottom of the stitch, the angle being less than ninety degrees and greater than zero degrees, at least a portion of the write gap residing on the front portion of the PMR pole, the write gap residing between the PMR pole and a portion of the shield, at least a portion of the additional pole residing between the PMR pole and the shield, a first portion of the additional pole adjoining the shield, the pole front surface of the additional pole being separated from the shield, the pole front surface of the additional pole being a first distance from the ABS, the front surface of the stitch terminating a second distance from the ABS, the first portion of the additional pole commencing a third distance from the ABS, the first distance being greater than the second distance and less than the third distance, at least a second portion of the additional pole adjoining the stitch, the at least one coil for energizing at least the additional pole; and
    a slider, at least one of the read transducer and the magnetic write transducer residing on the slider.

11. The magnetic recording head of claim 10 wherein the stitch front is not more than one micron from the ABS.

12. The magnetic recording head of claim 11 wherein the stitch front is between fifty nanometers and one micron from the ABS.

13. The magnetic recording head of claim 11 wherein the stitch front is not more than ten nanometers from the ABS.

14. The head of claim 10 wherein the angle is at least thirty degrees and not more than sixty-five degrees.

15. The head of claim 10 wherein the portion of the shield and the additional pole share a composition.

16. The head of claim 10 wherein the additional pole is recessed from the portion of the shield by at least one micrometer.

17. A method for providing magnetic transducer having an air-bearing surface (ABS), the method comprising:
    providing a perpendicular magnetic recording (PMR) pole having a first front portion proximate to the ABS;

providing a stitch on the PMR pole, the stitch having a stitch front portion recessed from the first front portion and a bottom, the stitch front portion having a front surface at an angle with respect to the bottom of the stitch, the angle being less than ninety degrees and greater than zero degrees;

providing a write gap, at least a portion of the write gap residing on the front portion of the PMR pole;

providing an additional pole recessed from the ABS and having a pole front surface substantially parallel to the ABS and separated from the shield, the pole front portion residing between the front portion of the stitch and the additional pole;

providing a shield, the write gap residing between the PMR pole and a portion of the shield, at least a portion of the additional pole residing between the PMR pole and the shield, a first portion of the additional pole adjoining the shield, the pole front surface of the additional pole being a first distance from the ABS, the front surface of the stitch terminating a second distance from the ABS, the first portion of the additional pole commencing a third distance from the ABS, the first distance being greater than the second distance and less than the third distance, at least a second portion of the additional pole adjoining the stitch; and providing at least one coil for energizing at least the additional pole.

18. The method of claim 17 wherein the providing the additional pole further includes:

providing a mask on a portion of the PMR transducer, the portion of the PMR transducer being recessed from the ABS;

depositing at least one material, the at least one material extending from the ABS to a back of the additional pole;

removing the mask.

19. The method of claim 17 wherein the providing the stitch further includes:

removing a portion of the stitch to form the stitch front portion including the angle with respect to the bottom of the stitch.

20. The method of claim 19 wherein the angle is at least thirty degrees and not more than sixty-five degrees.

21. The method of claim 17 wherein the providing the stitch further includes:

providing a mask on the PMR pole, the mask covering a portion of the PMR pole in proximity to the ABS;

depositing at least one material for the stitch; and removing the mask, a remaining portion of the material forming the stitch including the stitch front portion including the angle with respect to the bottom of the stitch.

22. The method of claim 21 wherein the angle is at least thirty degrees and not more than sixty-five degrees.

23. The magnetic transducer of claim 1 wherein the stitch has a first thickness and the additional pole has a second thickness greater than the first thickness.

24. The magnetic transducer of claim 9 wherein the stitch has a first thickness and the additional pole has a second thickness greater than the first thickness.

25. The head of claim 10 wherein the stitch has a first thickness and the additional pole has a second thickness greater than the first thickness.

26. The method of claim 17 wherein the stitch has a first thickness and the additional pole has a second thickness greater than the first thickness.

27. The magnetic transducer of claim 1 further comprising:

a return pole having a return pole front surface residing at the ABS, the PMR pole, the stitch and the additional pole residing between the shield and the return pole.

* * * * *